(12) United States Patent
Akama et al.

(10) Patent No.: US 9,160,691 B2
(45) Date of Patent: Oct. 13, 2015

(54) INFORMATION PROCESSING APPARATUS IMPLEMENTING RESPONSE TO EDITING MESSAGE

(71) Applicant: Fujitsu Limited, Kawasaki-shi (JP)

(72) Inventors: Katsuaki Akama, Kawasaki (JP); Takeshi Matsuda, Kanazawa (JP); Shinichi Takeda, Kanazawa (JP); Kyouta Sakai, Kanazawa (JP); Atsushi Nagasawa, Kanazawa (JP); Jun'ichi Kosaka, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/705,689

(22) Filed: Dec. 5, 2012

(65) Prior Publication Data

US 2013/0097266 A1 Apr. 18, 2013

Related U.S. Application Data

(63) Continuation of application No. 12/721,449, filed on Mar. 10, 2010, now Pat. No. 8,364,768.

(30) Foreign Application Priority Data

Mar. 11, 2009 (JP) .................................. 2009-57865

(51) Int. Cl.
*G06F 15/16* (2006.01)
*H04L 12/58* (2006.01)
*G06Q 10/00* (2012.01)

(52) U.S. Cl.
CPC ................ *H04L 51/04* (2013.01); *G06Q 10/00* (2013.01)

(58) Field of Classification Search
CPC ... H04M 1/72552; H04L 12/581; H04L 51/04
USPC .................. 709/204, 205, 206, 217, 219, 250
See application file for complete search history.

(56) References Cited

U.S. PATENT DOCUMENTS

| 7,809,744 | B2 | 10/2010 | Nevidomski et al. | |
|---|---|---|---|---|
| 7,818,375 | B2* | 10/2010 | Malik et al. | 709/206 |
| 7,953,844 | B2* | 5/2011 | Deshpande | 709/224 |
| 8,041,770 | B1* | 10/2011 | Schmidt | 709/206 |
| 2003/0033533 | A1 | 2/2003 | Meisel | |
| 2003/0154251 | A1 | 8/2003 | Manabe et al. | |
| 2004/0006599 | A1 | 1/2004 | Bates et al. | |
| 2009/0100171 | A1* | 4/2009 | Haynes et al. | 709/224 |
| 2009/0113015 | A1* | 4/2009 | Koster | 709/207 |
| 2009/0172114 | A1 | 7/2009 | Srikanth et al. | |

FOREIGN PATENT DOCUMENTS

| JP | 2000-181847 A | 6/2000 |
|---|---|---|
| JP | 2003-044416 | 2/2003 |

(Continued)

OTHER PUBLICATIONS

USPTO, (VU) Non-Final Rejection, Mar. 16, 2012, in parent U.S. Appl. No. 12/721,449 [allowed].

(Continued)

*Primary Examiner* — Viet Vu
(74) *Attorney, Agent, or Firm* — Fujitsu Patent Center

(57) ABSTRACT

An information processing apparatus includes a receiving unit that receives messages, and a control unit that sends an editing message indicating that a reply message responding to a received message received by the receiving unit is being edited, to a sending source of the received message.

21 Claims, 16 Drawing Sheets

(56) References Cited

FOREIGN PATENT DOCUMENTS

| JP | 2006-295468 A | 10/2006 |
|---|---|---|
| JP | 2008-186214 A | 8/2008 |

OTHER PUBLICATIONS

USPTO, (VU) Notice of Allowance, Aug. 30, 2012, in parent U.S. Appl. No. 12/721,449 [allowed].

Japanese Office Action mailed Oct. 16, 2012 for corresponding Japanese Application No. 2009-057865, with partial English-language translation.

Japanese Office Action mailed Sep. 3, 2013 for corresponding Japanese Application No. 2012-274935, with Partial English-language Translation.

Japanese Office Action mailed Dec. 10, 2013 for corresponding Japanese Application No. 2012-274935, with Partial English-language Translation.

JPOA—Office Action of Japanese Patent Application No. 2012-274935 dated Mar. 24, 2015 with partial English Translation.

* cited by examiner

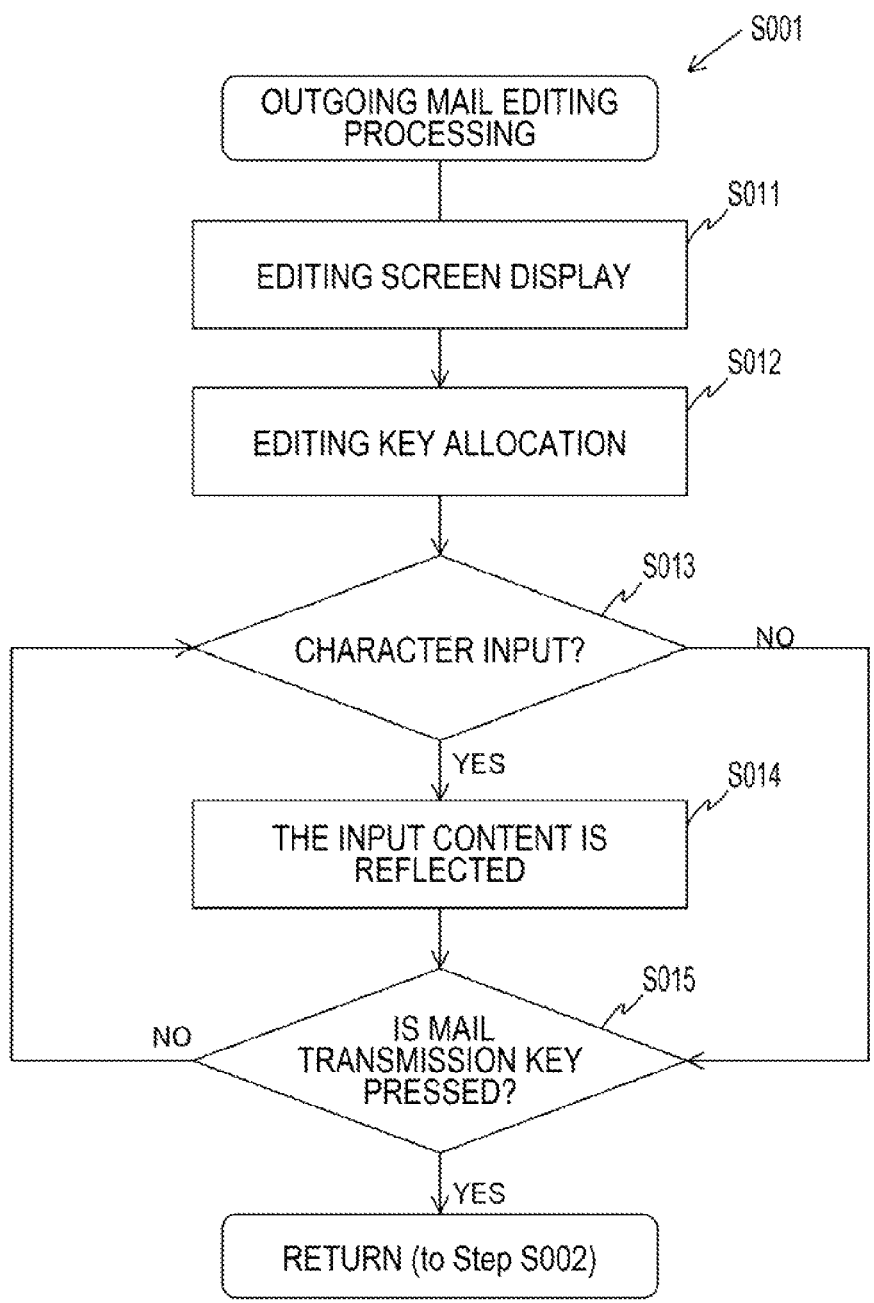

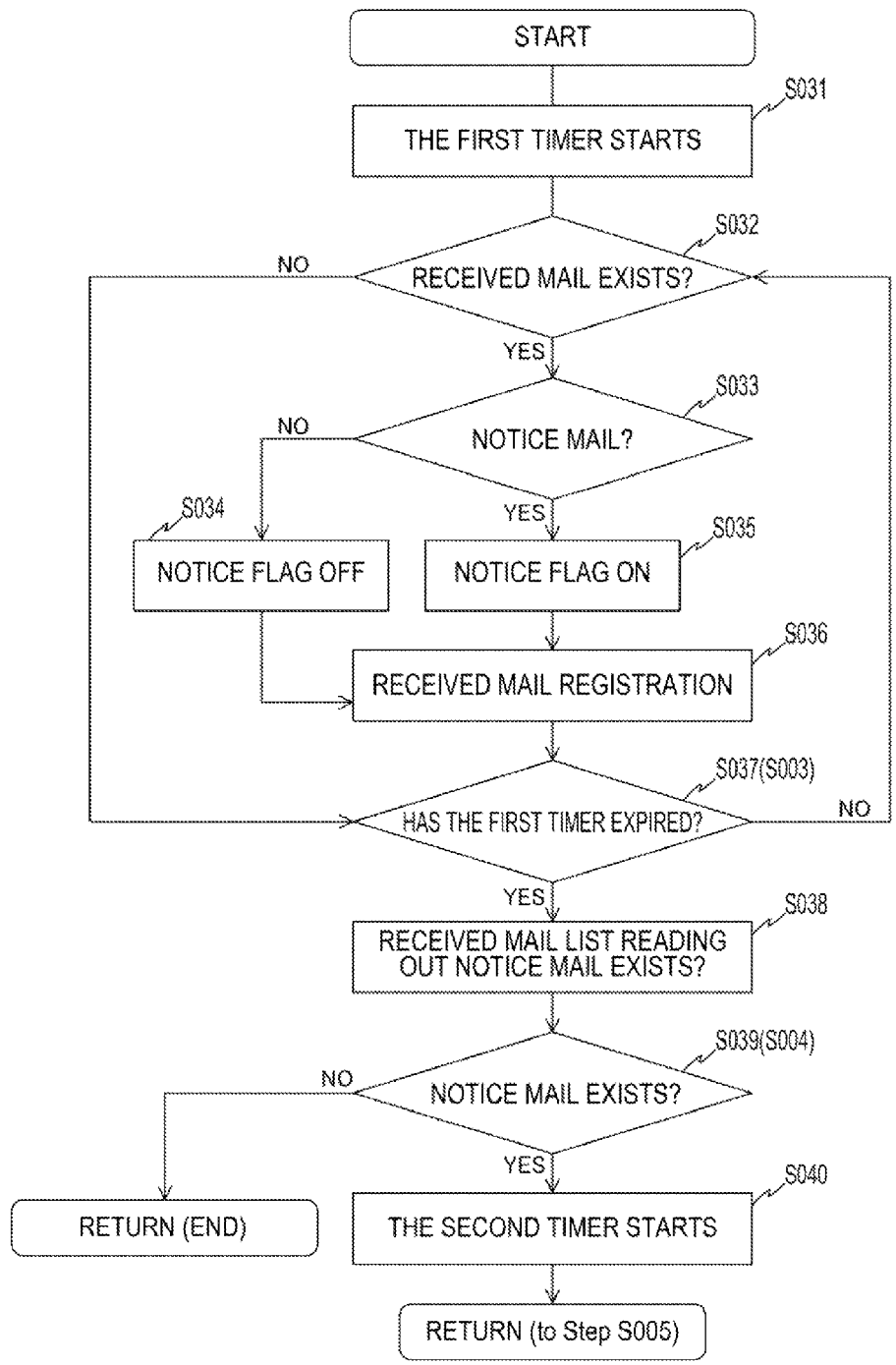

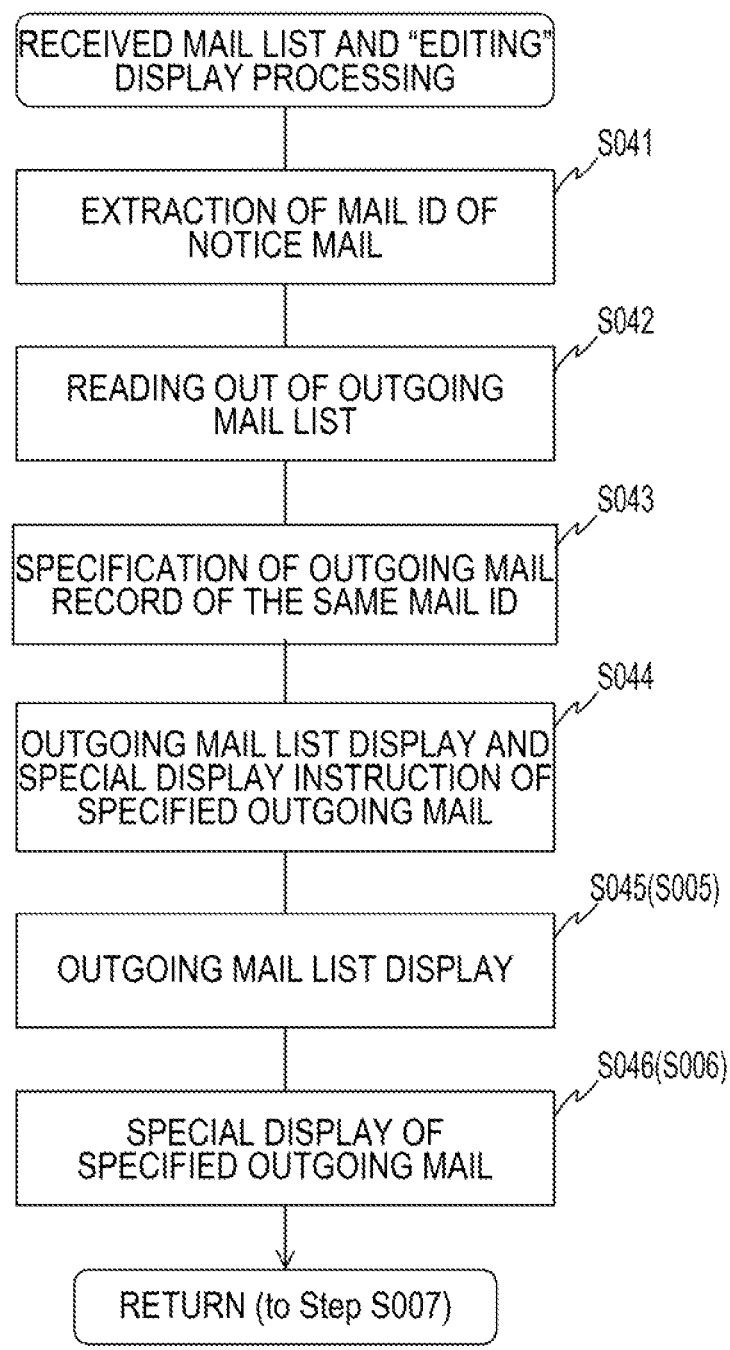

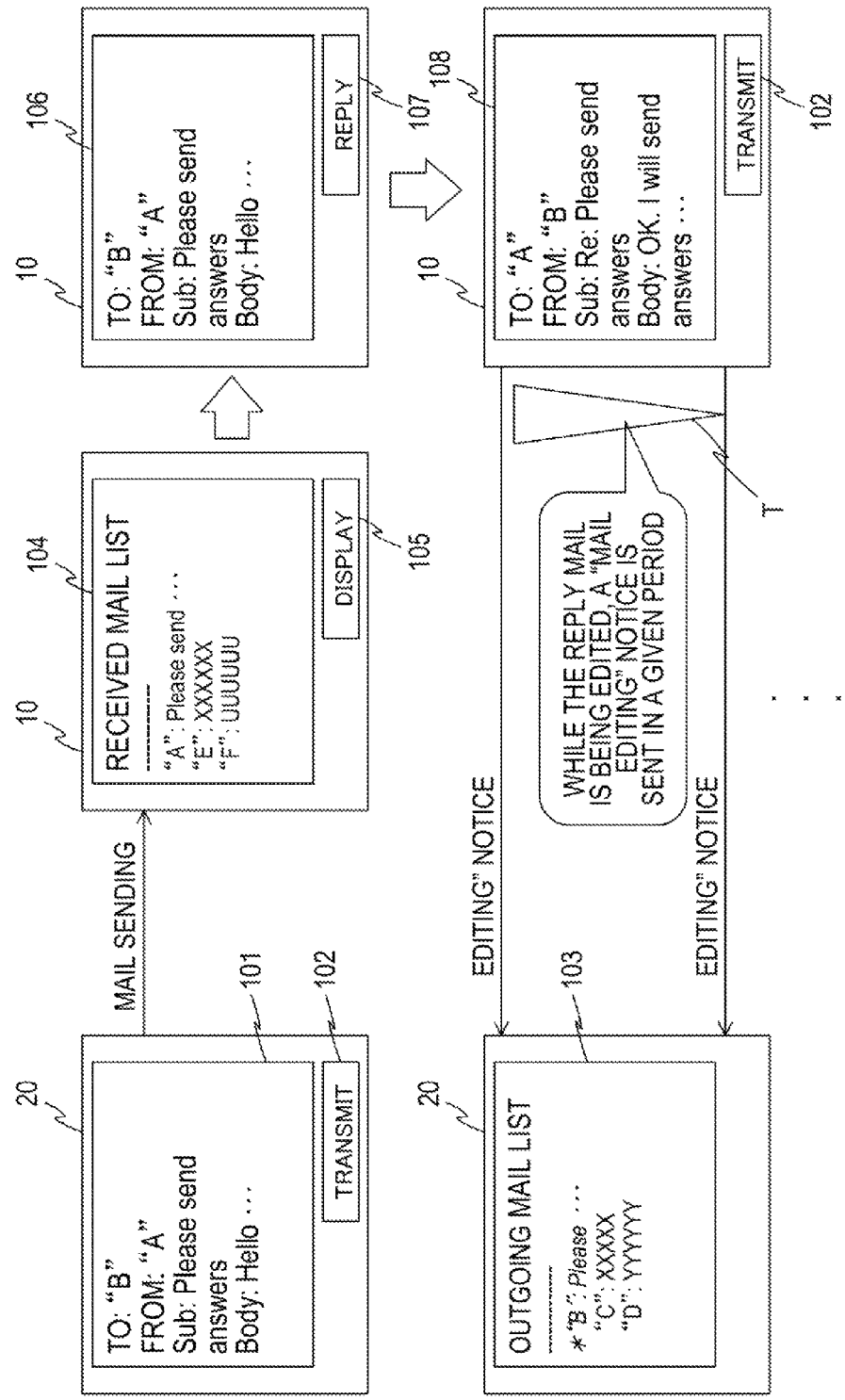

FIG.6

RECEIVED MAIL LIST

| ID: MAIL ID | SENDING SOURCE MAIL ADDRESS | SUBJECT | NOTICE FLAG | RECEPTION TIME |
|---|---|---|---|---|
| XXXXXXX | ccc@ddd.com | AAA | YYYYYYY(ON) | 200902251124 |
| UUUUUUU | AAA@ddd.com | BBB | 0000000(OFF) | 200902251119 |
| . . . | | | | |

FIG.7

ID: XXXXXXX
SPECIAL CODE: YYYYYYY
TO: "A"
FROM: "B"(OPTION)
SUB: (NONE OR OPTION)
BODY: (NONE OR OPTION)

INFORMATION PROCESSING APPARATUS IMPLEMENTING RESPONSE TO EDITING MESSAGE

CROSS-REFERENCE TO RELATED APPLICATIONS

This application is a continuation of application Ser. No. 12/721,449, filed Mar. 10, 2010 (issued as U.S. Pat. No. 8,364,768 on Jan. 29, 2013), is based and claims the benefit of priority of the prior Japanese Patent Application No. 2009-57865, filed on Mar. 11, 2009, the entire contents of which are incorporated herein by reference.

FIELD

The present invention relates to an information processing apparatus that sends or receives, for example, messages.

BACKGROUND

Conventionally, there is an information processing apparatus that has an electronic mail (hereinafter referred to as "mail") sending and receiving function. The above-described information processing apparatus may be, for example, a Personal Computer (PC), a Personal Digital Assistants (PDA), or a mobile phone terminal.

In a field of the personal computer, there has been a mailer that sends an already-read mail indicating that the mail is read to a sending source of the mail when the mail is read at a sending destination of the mail. A mailer is software that generates, sends, receives mail, and stores and manages received mail. Japanese Laid-Open Patent Publication No. 2003-44416, for example, has been known as a conventional technique.

In the above-described conventional technique, by receiving the already-read mail, the sending source of the mail is able to know that the mail is read in the sending destination of the mail. However, the sending source is unable to know whether or not a reply mail responding to the mail is being edited.

SUMMARY

According to an aspect of the invention, an information processing apparatus includes a receiving unit that receives messages, and a control unit that sends an editing message indicating that a reply message responding to a received message received by the receiving unit is being edited, to a sending source of the received message.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3B is a flowchart illustrating an example of outgoing mail editing processing illustrated in FIG. 3A, FIG. 3D is a flowchart illustrating an example of editing notice check processing illustrated in FIG. 3A, FIG. 3E is a flowchart illustrating a outgoing mail list and editing display processing illustrated in FIG. 3A, FIG. 5 is an explanation diagram of an operation example of the first embodiment, FIG. 6 is a diagram illustrating a data configuration example of a received mail list, FIG. 7 is an example of an electronic mail as an editing notice.

DESCRIPTION OF THE EMBODIMENTS

Description will be made below of an embodiment of an information processing apparatus of the present invention. A configuration of the embodiment described below is an example. The present invention is not limited to the configuration of the embodiment.

The information processing apparatus sends messages to or receives messages from another information processing apparatus. A message format may be, for example, an electronic mail or a short message. In the present embodiment, a message exchange format other than an electronic mail or a short message may also be used.

In the embodiment of the information processing apparatus, a message sending destination sends, to a message sending source, an editing notice indicating that a reply message is being edited. As a sending method of the above-described editing notice, that is, an editing message, an electronic mail or a short message may be used, for example. Alternatively, a call signal to a terminal of an opposite-side party may be added with the editing message and then sent. The editing message to be sent may be represented by the content of the message. The content of the message may be, for example, a text, an image, or a video. Alternatively, the editing message to be sent may be an identification code of the message that enables a receiver to reproduce the message according to the code content.

First Embodiment

A Configuration of an Information Processing Apparatus

Figure 1:
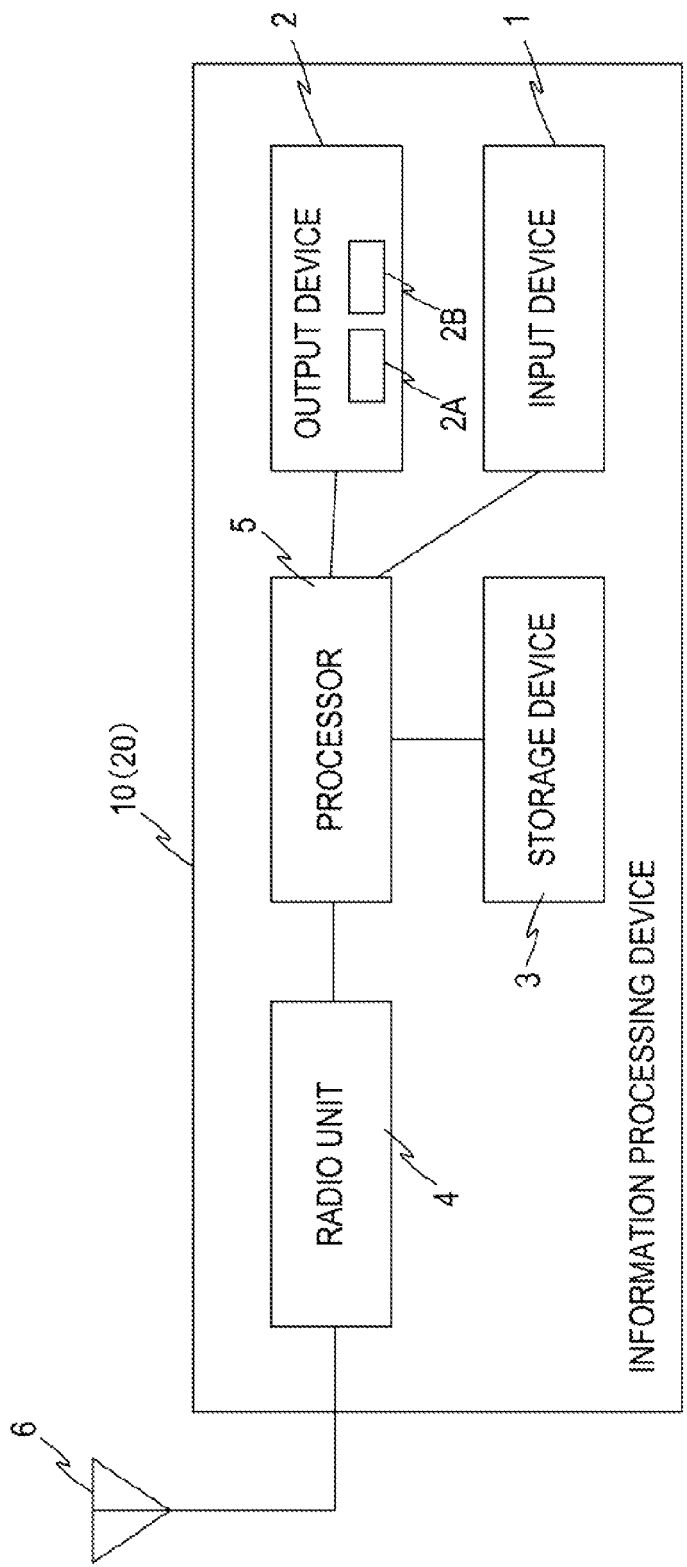
FIG. 1 is a diagram illustrating a configuration example of a first embodiment of an information processing apparatus.

FIG. 1 is a diagram illustrating a first embodiment of an information processing apparatus. An information processing apparatus 10 may be an electronic device such as, for example, a mobile phone, a PC, a PDA, a car navigation device, or the like that has an electronic mail sending and receiving function. An electronic mail may be simply called "mail."

In FIG. 1, the information processing apparatus 10 includes an input device 1, an output device 2, a storage device 3, a radio unit 4, and a processor (e.g., a calculation processing device) 5 that is connected to the input device 1, the output device 2, the storage device 3, and the radio unit 4. A sending and receiving antenna 6 is connected to the radio unit 4.

The input device 1 includes a plurality of keys and buttons. When the keys and the buttons are not distinguished, the input device 1 may be represented as just a key. The plurality of keys include various keys such as an input key used to input data or information, a cursor key, and a determination key. The input device 1 may include a pointing device such as a mouse in addition to the plurality of keys. The above-described determination key may be an enter key, for example.

The output device 2 includes a display device 2A and a speaker 2B. The display device 2A may be, for example, a Liquid Crystal Display (LCD) or a Cathode Ray Tube (CRT) that displays information or data based on a performance result of a program obtained by the processor 5. The speaker 2B outputs sound.

The storage device 3 is a computer-readable medium that includes a main storage device and a secondary storage device. The main storage device includes, for example, a Random Access Memory (RAM) or a Read Only Memory (ROM) that is called a memory. The storage device 3 may include at least either a hard disc drive (HDD) or an Erasable Programmable ROM (EPROM), for example, as a secondary storage unit. The storage device 3 may include a drive unit of a portable disc recording medium such as a Compact Disc (CD) or a Digital Versatile Disc (DVD) as a secondary storage unit. As the secondary storage device, a Universal Serial Bus (USB) memory, which is a portable recording medium, may be used.

An Operating System (OS) and a plurality of application programs are installed on the storage device 3. The storage device 3 stores data to be used when the programs are executed. The plurality of application programs include a program that makes the information processing apparatus 10 function as an electronic mail device, that is, for example, a program for electronic mail for sending, receiving, storing, and managing electronic mail. The program for electronic mail may be called a "mailer."

The radio unit 4 modulates a data signal that is generated by the processor 5 into a radio signal, and then sends the data signal through the sending and receiving antenna 6. The radio unit 4 demodulates the radio signal that is received through the sending and receiving antenna 6 and then sends the radio signal to the processor 5. The above-described data signal is an electric signal.

The information processing apparatus 10 illustrated in FIG. 1 is connected to a network N (see FIG. 2) through a base station B1 (see FIG. 2) by radio communication using the radio unit 4, and then sends and receives electronic mails. The information processing apparatus 10 may include a communication interface device such as a Local Area Network (LAN) interface to be connected to a network through a communication cable, and may send and receive electronic mail.

The processor 5 may be, for example, a processor device such as a Central Processing Unit (CPU) or a Data Signal Processor (DSP). The processor 5 is connected to the input device 1, the output device 2, the storage unit 3, and the radio unit 4 through a plurality of input and output units (not illustrated). The input and output unit may be called an "I/O unit."

The processor 5 controls operations of the input device 1, the output device 2, the storage device 3, and the radio unit 4 by loading and executing various programs, which are installed on the storage device 3, in a memory (RAM) of the storage device 3. This makes it possible to achieve functions matching specified purposes. In the present embodiment, the information processing apparatus 10 functions as an electronic mail device that sends, receives, and manages electronic mail through execution of a program by the processor 5.

Figure 2:
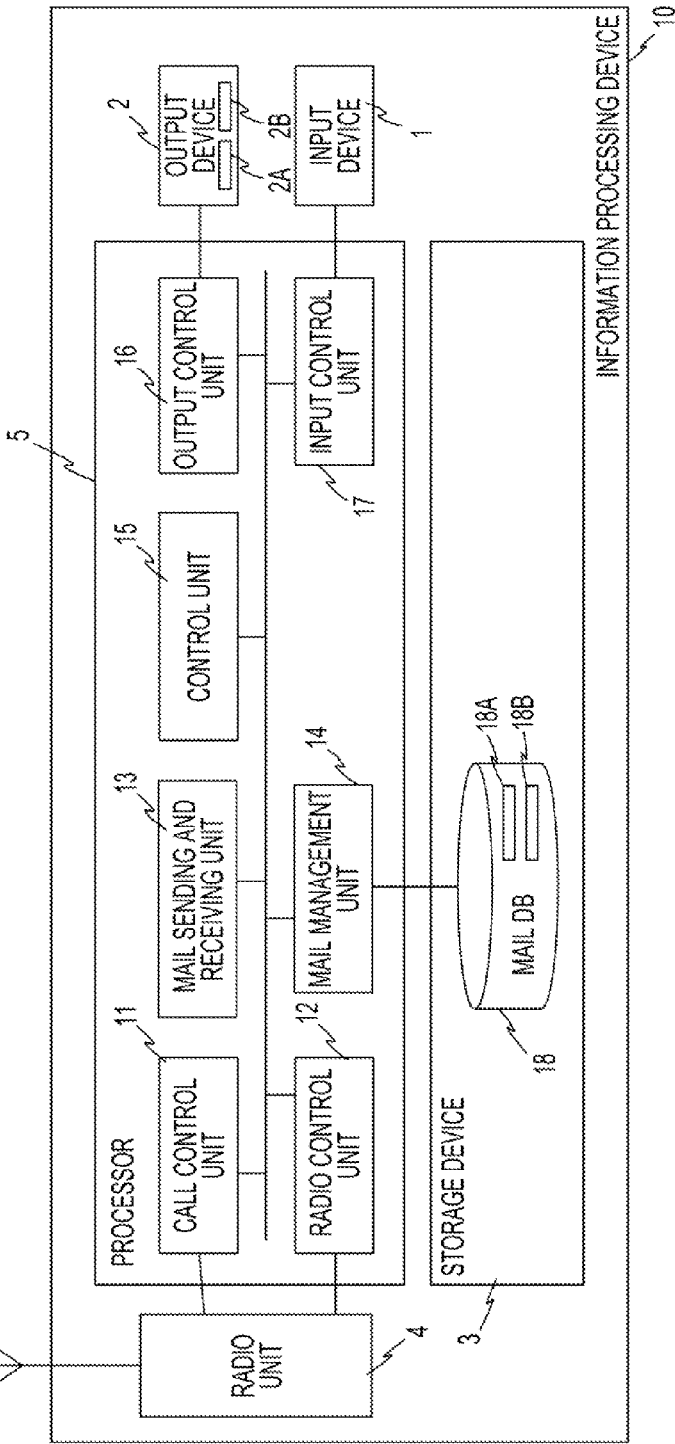
FIG. 2 is a diagram illustrating another configuration example of the first embodiment of the information processing apparatus.

FIG. 2 is a diagram typically illustrating a function as an electronic mail device that is achieved by executing at least one of the programs, installed on the storage device 3, by the processor 5.

As illustrated in FIG. 2, a call control unit 11, a radio control unit 12, a mail sending and receiving unit 13, a mail management unit 14, a control unit 15, an output control unit 16, and an input control unit 17 are achieved through execution of the program by the processor 5.

A mail database 18 is generated on a storage area of the storage device 3 by executing the program. The mail database 18 may be represented as a "mail DB 18". The mail DB 18 is a database for storing and managing electronic mail that is sent and received, a received mail list 18A, and an outgoing mail list 18B.

The radio control unit 12 establishes a path for radio communications with a base station B1 on a network N through control of the radio unit 4. The call control unit 11 performs call connection for packet communication with a mail server M1 connected to the network N.

The mail sending and receiving unit 13 performs mail sending and receiving processing. That is, the mail sending and receiving unit 13 performs a process for uploading mail, which is to be sent in response to a mail sending request, to the mail server M1 by using a sending protocol such as Simple Mail Transfer Protocol (SMTP). This uploading processing is mail sending processing. According to a mail reception request or an automatic mail receiving setting, the mail sending and receiving unit 13 performs a process for downloading the mail that arrives in a mail box of the mail server M1 by using a reception protocol such as a Post Office Protocol (POP). This downloading processing is mail receiving processing.

The mail management unit 14 performs registration and management of mail in the mail DB 18. The mail management unit 14 generates a list of outgoing mail that is sent from the information processing apparatus 10, and then stores the outgoing mail in the mail DB 18 as the outgoing mail list 18B. The mail management unit 14 generates a list of received mail that is stored in the mail DB 18, and then stores the received mail in the mail DB 18 as the received mail list 18A.

In response to a list display request, the mail management unit 14 reads out the received mail list 18A or the outgoing mail list 18B from the mail DB 18, and then sends the received mail list 18A or the outgoing mail list 18B to the output control unit 16. The received mail list 18A or the outgoing mail list 18B is displayed on a screen of the display device 2A by the output control unit 16. The list display request may be a received mail list display request for requesting the received mail list 18A to be displayed or an outgoing mail list display request for requesting the outgoing mail list 18B to be displayed.

The control unit 15 performs various processes related to mail focusing on processes for editing mail. For example, the control unit 15 reads out a received mail or an outgoing mail from the mail DB 18 through the mail management unit 14 in response to the mail display request from the input control unit 17, and then sends the received mail or the outgoing mail to the output control unit 16. The output control unit 16 displays the received mail or the outgoing mail on the screen of the display device 2A. The mail display request is a received mail display request for requesting the received mail to be displayed or an outgoing mail display request for requesting the outgoing mail to be displayed.

For example, in response to a mail editing request from the input control unit 17, the control unit 15 instructs the output control unit 16 to display an editing screen on the screen of the display device 2A. The mail editing request includes a reply mail editing request for editing a reply mail responding to the received mail, a transfer mail editing request for editing a transfer mail responding to the received mail or the outgoing mail, and a new mail editing request for editing a new outgoing mail. This editing includes generation of mail. The control unit 15 provides a mail generation environment to a user of the information processing apparatus 10 in cooperation with the output control unit 16 and the input control unit 17. The control unit 15 instructs the mail sending and receiving unit 13 to send an edited outgoing mail. The edited outgoing mail may be a reply mail, a transfer mail, or a new mail.

When receiving the reply mail editing request, the control unit 15 performs a process for periodically sending a message indicating that the reply mail is being edited to the destination of the reply mail, that is, the sending source of the received mail corresponding to the reply mail. The process for periodically sending is message sending processing.

The output control unit 16 generates screen data containing information and data in accordance with an instruction from the mail management unit 14, the control unit 15, or the input control unit 17, and then controls the display on the screen of the display device 2A. For example, the output control unit 16 generates various display screen data such as a received mail list screen, an outgoing mail list screen, an editing screen, or a mail display screen, and then displays the display content based on the display screen data on the screen of the display device 2. The output control unit 16 displays data such as characters, figures, or signs input from the input device 1 on the screen according to an instruction from the input control unit 17. Furthermore, the output control unit 16 performs sound reproduction processing based on sound data that is stored in advance in the storage device 3, and then outputs reproduction sound from the speaker 2B.

The input control unit 17 issues various requests that are input from the input device 1 to the mail management unit 14 and the control unit 15. The input control unit 17 issues the display request of the data that is input from the input device 1 to the output control unit 16. Furthermore, according to the display content of the display device 2A, the input control unit 17 may change function allocation with respect to the plurality of keys provided in the input device 1.

By implementing the various above-described functions, the information processing apparatus 10 may send and receive mail to and from the information processing apparatus 20 through the network N.

Operation Example

As an operation example of the above-described information processing apparatus 10 that functions as an electronic mail device, description will be made of processes for sending and receiving electronic mail. As an operation example, description will be made of operations of the information processing apparatuses 10 and 20 in a case where the information processing apparatus 10 receives mail from the information processing apparatus 20. The information processing apparatus 20 includes the same configuration as that of the information processing apparatus 10 illustrated in FIG. 1 and FIG. 2.

Figure 3A:
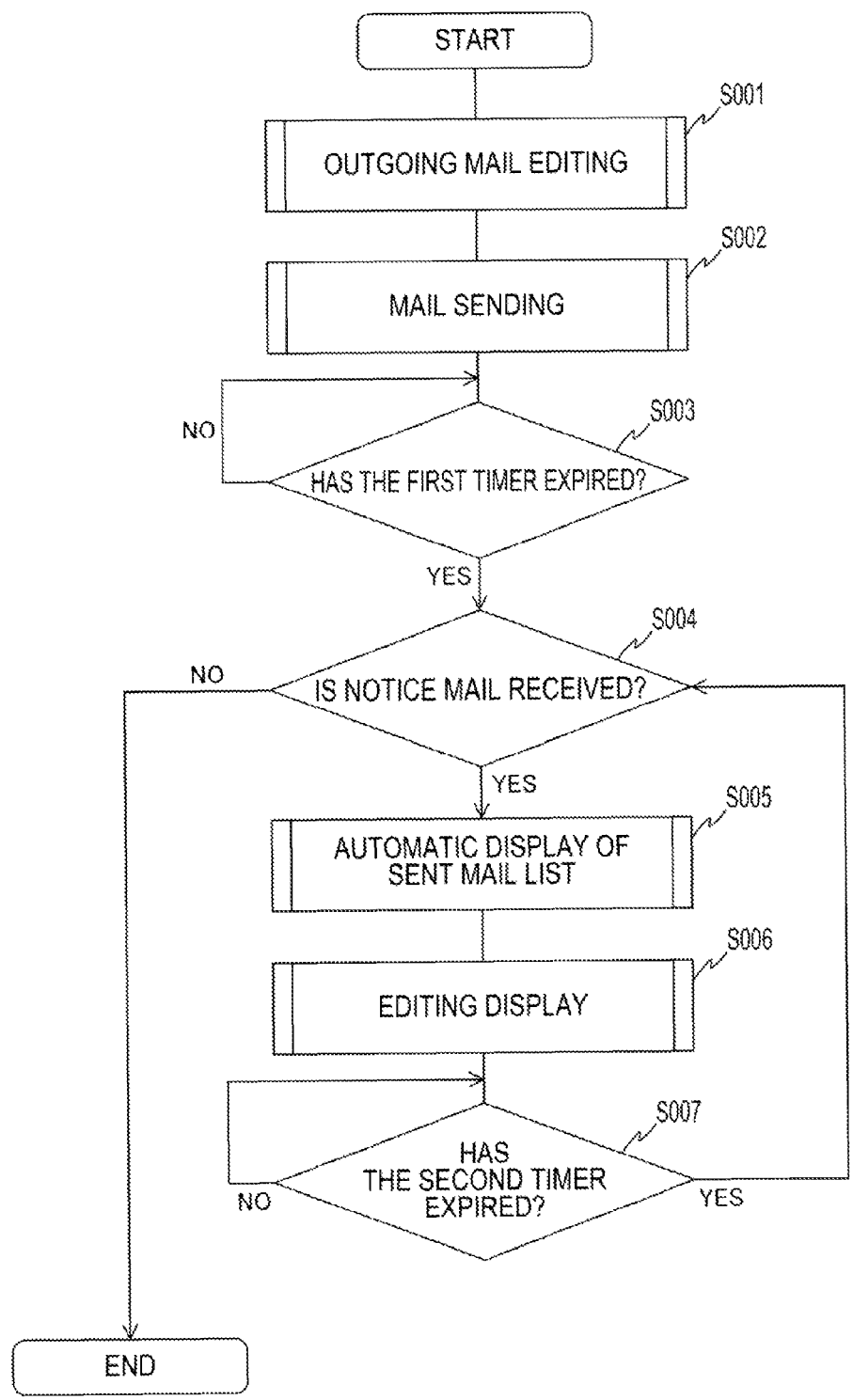
FIG. 3A is a flowchart illustrating mail sending processing performed in the information processing apparatus in a sending source of a mail.
Figure 4A:
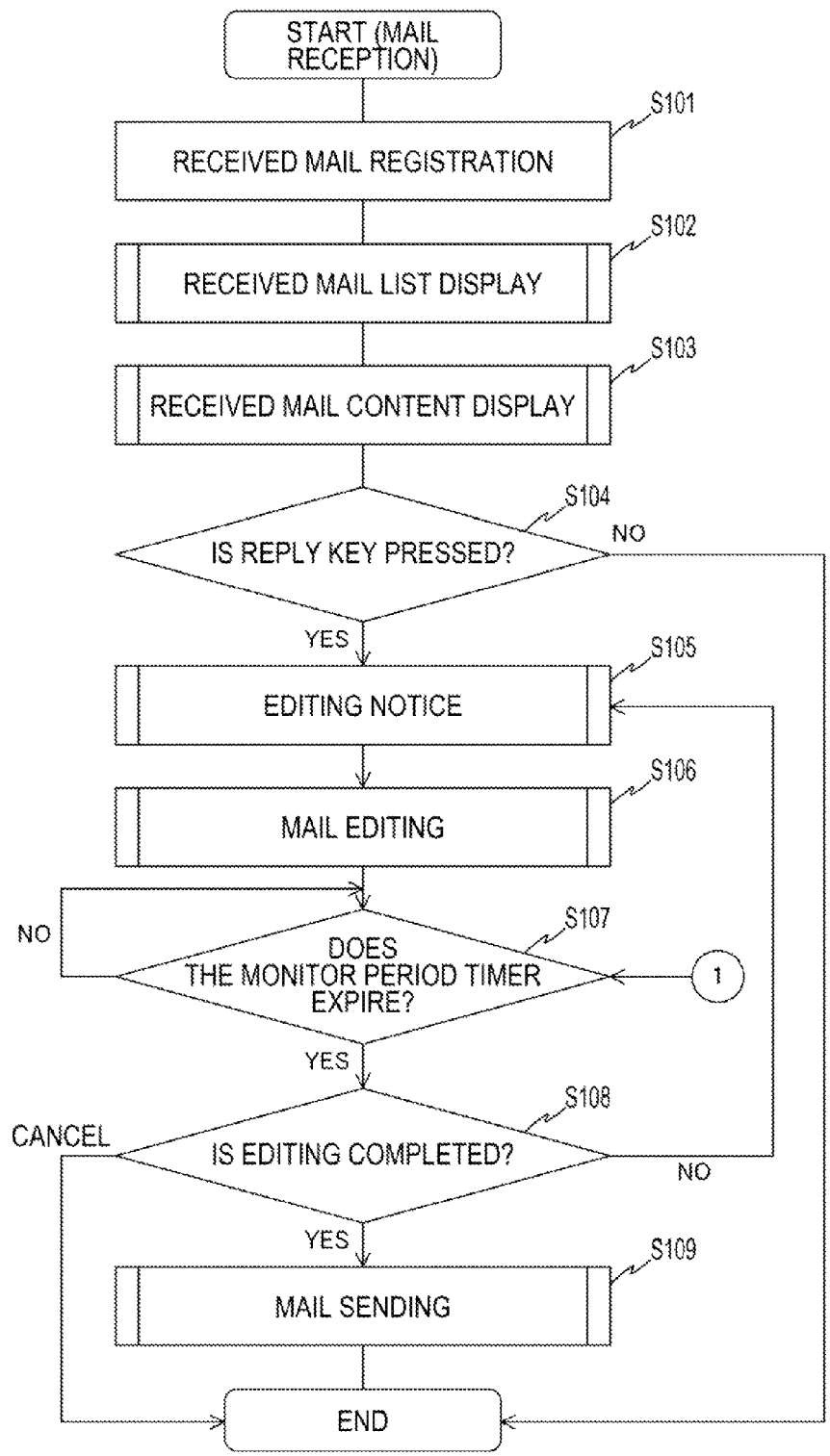
FIG. 4A is a flowchart illustrating mail receiving processing performed in the information processing apparatus in a mail sending destination of a mail.

FIG. 3A is a flowchart illustrating an overall process example of the information processing apparatus 20 in the operation example, that is, the sending source of the mail. FIG. 4A is a flowchart illustrating an overall process example of the information processing apparatus 10 in the operation example, that is, the sending source of the mail. FIG. 5 is an explanation diagram of the operation example.

Process in the Mail Sending Source

The flowchart illustrated in FIG. 3A starts, for example, when a user A of the information processing apparatus 20 inputs a mail editing request using the input device 1 of the information processing apparatus 20. In the process in FIG. 3A, the mail sending and receiving unit 13 is in an automatic mail reception setting state in which mail that arrives in the mail box of the mail server M1 is downloaded as received mail.

In Step S001 of FIG. 3A, outgoing mail editing processing in accordance with the mail editing request is performed. FIG. 3B is a flowchart illustrating an example of the outgoing mail editing processing. In FIG. 3B, the control unit 15 issues a display instruction of the editing screen of the outgoing mail to the output control unit 16. According to this display instruction, the output control unit 16 displays the editing screen on the display device 2A (Step S011). At this time, the control unit 15 sets a sending source mail address, that is, the mail address of the user A, into the editing screen.

The editing screen includes, for example, an input screen or an input column for a sending destination mail address, that is, the mail address of the user B who is the user of the information processing apparatus 10, an input screen or an input column for the subject of the mail, and an input screen or an input column for the body of the mail.

The control unit 15 sends an allocation instruction of an editing key to the input control unit 17 (Step S012). According to the allocation instruction, the input control unit 17 allocates a given plurality of keys as a mail sending key (e.g., an editing end key), a character input key, and a cancel key.

The input control unit 17 waits for a character input of the sending destination mail address, the subject of the mail, and the body of the mail that are input by the character input key (Step S013). When a character is input (YES in Step S013), the input control unit 17 sends an input result to the output control unit 16. The output control unit 16 reflects the input result in the display content of the display device 2A through control of the display device 2A (Step S014). FIG. 5 is a diagram illustrating an example of an editing screen 101. The editing screen 101 displays information such as the sending destination mail address, the subject of the mail, and the body of the mail that is input by the user A.

Each time character input is performed, the control unit 15 determines whether or not a mail transmission key 102 (see FIG. 5) is pressed (Step S015). If the mail transmission key 102 is pressed (YES in Step S015), the outgoing mail editing processing is ended. The process goes to Step S002 in FIG. 3A. If the mail transmission key 102 is not pressed (NO in Step S015), the process goes back to Step S013.

In loop processing from Step S013 to Step S015, the editing screen 101 on the display device 2A displays the sending destination mail address, the subject of the mail, and the body text of the mail and the like that are input by the user A. For example, as illustrated in FIG. 5, the editing screen 101 may display, for example, the sending destination mail address ("A"), the sending source mail address ("B"), the subject of the mail ("please send answers"), and the body of the mail ("Hello . . . "). The editing screen 101 at the end of the editing functions as an editing content confirm screen.

When the editing of the outgoing mail is ended, if the user A presses the mail transmission key 102, the determination is "YES" in Step S015. Then the outgoing mail editing processing is ended, and the process goes to Step S002 (see FIG. 3A).

Figure 3C:
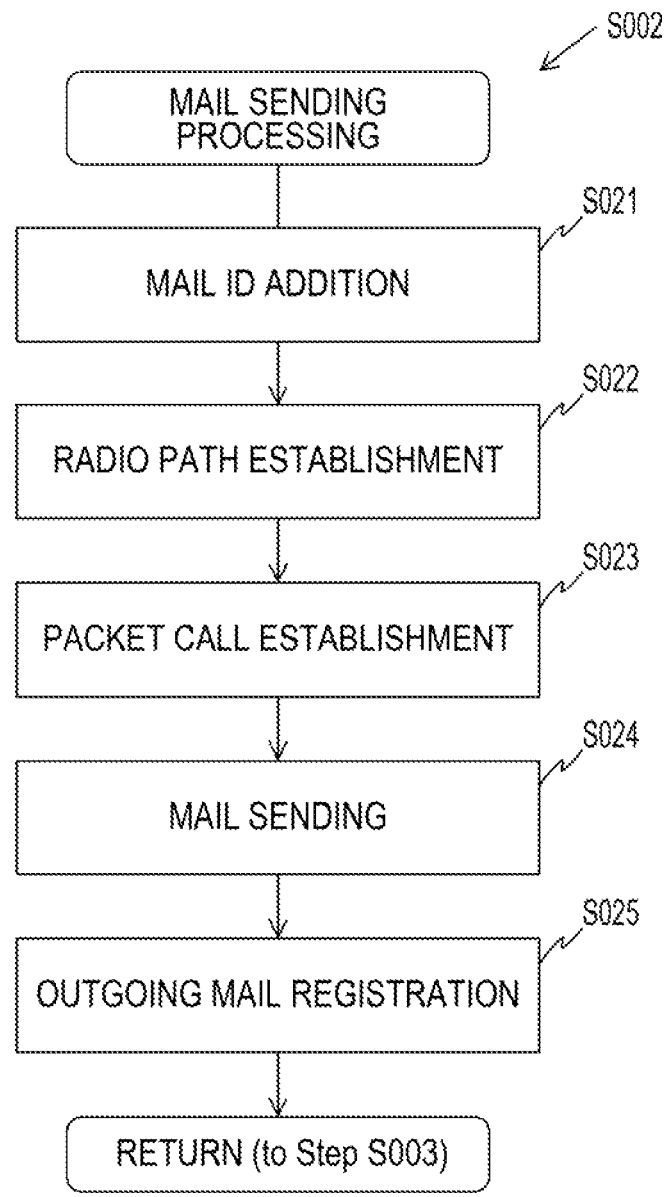
FIG. 3C is a flowchart illustrating an example of the mail sending processing illustrated in FIG. 3A.

In Step S002, mail sending processing is performed. FIG. 3C is a flowchart illustrating an example of the mail sending processing. If the mail transmission key 102 is pressed, the input control unit 17 gives a mail sending request to the control unit 15. When receiving the mail sending request, the control unit 15 gives an edited mail, that is, outgoing mail data, to the mail sending and receiving unit 13.

The mail sending and receiving unit 13 adds identification information of the mail, that is, a mail ID to the outgoing mail data (Step S021). A mail ID may be called a "mail number."

The mail sending and receiving unit 13 issues an establishment request of a radio path to the radio control unit 12. The radio control unit 12 controls the radio unit 4 and establishes a radio path to the base station B1 in a communication area of the information processing apparatus 20 (Step S022).

The mail sending and receiving unit 13 issues a call establishment request to the call control unit 11. The call control unit 11 establishes a packet call for mail sending between the call control unit 11 and the mail server M1 on the network N (Step S023).

When the packet call is established, the mail sending and receiving unit 13 sends an outgoing mail (Step S024). The mail sending and receiving unit 13 generates one or more packets that include the outgoing mail data containing the mail ID. One or more packets are sent through the radio unit 4 and the sending and receiving antenna 6 and received by the base station B1. After that, one or more packets arrive in the mail server M1 through the network N. Outgoing mail data is formed from one or more packets. In this manner, the outgoing mail data, that is, the outgoing mail is sent to the mail server M1.

The outgoing mail that arrives in the mail server M1 is transferred in the network N according to the sending destination mail address "A" and finally arrives in the mail box of a mail server M2 of the user B.

When the mail sending is completed by the mail sending and receiving unit 13, outgoing mail register processing is performed. After the mail sending and receiving unit 13 completes the mail sending, the control unit 15 issues an outgoing mail register request to the mail management unit 14. The according to the outgoing mail register request, the mail management unit 14 stores the outgoing mail in the mail DB 18. The mail management unit 14 registers the outgoing mail in the outgoing mail list 18B in the mail DB 18. The outgoing mail and the outgoing mail registered in the outgoing mail list 18B are identified with the mail IDs added to the outgoing mail. After the process of Step S025 is ended, the mail sending processing is ended. The process goes to Step S003 (see FIG. 3A).

After the mail sending processing (Step S002) is completed, the control unit 15 starts a first timer to wait for an editing notice from the sending destination of the mail (Step S003). The clocking time of the first timer may be set appropriately.

After the clocking of the first timer is ended (YES in Step S003), the control unit 15 determines whether or not the mail sending and receiving unit 13 receives the editing notice from the sending source during the clocking time of the first timer (Step S004).

If the editing notice is not received in Step S004 (NO in Step S004), processing of the mail sending source at the time of the mail sending is ended. If the editing notice is received in Step S004 (YES in Step S004), the process goes to Step S005.

FIG. 3D is a flowchart illustrating details of processes of Step S003 and Step S004. The processes of Step S003 and Step 004 are called editing notice check processing. In FIG. 3D, for example, when the mail sending is completed by the mail sending and receiving unit 13, the control unit 15 starts the first timer provided in the control unit 15. The first timer is used to wait for a first editing notice from the sending destination of the outgoing mail.

The mail sending and receiving unit 13 accesses the mail server M1 according to the automatic mail reception setting to determine whether or not the mail box has the received mail (Step S032). At this time, if the mail box has no received mail (NO in Step S032), the process goes to Step S036.

If the mail box has the received mail (YES in Step S032), the mail sending and receiving unit 13 receives the received mail from the mail server M1 and gives the received mail to the control unit 15. The control unit 15 determines whether or not the received mail is an editing notice mail (Step S033). An editing notice mail may be called a "notice mail."

The editing notice mail indicates that the sending destination of the outgoing mail is editing a reply mail responding to the outgoing mail. The notice mail is sent from the sending destination of the outgoing mail. The notice mail includes a special code. The control unit 15 may determine whether or not the received mail is a notice mail by determining whether or not the received mail includes the special code indicating that the received mail is a notice mail. As the special code, for example, the mail ID of the outgoing mail may be used. The mail ID of the outgoing mail may be used as the identification information of the notice mail and is used to specify a corresponding outgoing mail.

If the received mail is not a notice mail, that is, if the received mail does not include the mail ID of the outgoing mail (NO in Step S033), the control unit 15 determines to turn off a notice flag that is described below (Step S034). The process goes to Step S036.

If the received mail is a notice mail, that is, if the received mail includes the mail ID of the outgoing mail (YES in Step 033), the control unit 15 determines to turn on the notice flag (Step S035). The process goes to Step S036.

In Step S036, received mail register processing is performed. The control unit 15 notifies the mail management unit 14 of the received mail and a determination result indicating the notice flag is turned on or off. The mail management unit 14 registers the received mail in the mail DB 18 and the received mail list 18A.

FIG. 6 is a data configuration example of the received mail list 18A. As illustrated in FIG. 6, the received mail list 18A has a record for each of the received mails registered in the received mail list 18A. The record includes a mail ID, a sending source mail address, a subject, a notice flag, and a reception time (time stamp) of the received mail. The record may include a sending destination mail address.

The mail management unit 14 generates a new record of the received mail on the received mail list 18A and registers the mail ID, the sending source mail address, the subject of the mail, and the reception time. At this time, according to the determination result indicating on or off of the notice flag, the mail management unit 14 sets a state of the notice flag, that is, whether or not the flag is turned on ("1") or off ("0") for the new record. If the notice flag is set to be turned on, a flag value is set to a value of the mail ID of the outgoing mail. If the notice flag is set to be turned off, the flag value is set to, for example, "all zero" that is a value indicating that the notice flag is turned off.

The received mail registered in the received mail list 18A is identified by the mail ID. Depending on whether the notice flag is turned on or off, the received mail may be identified to be a notice mail or not. The notice mail registered in the received mail list 18A may be prevented from being displayed on the display device 2A based on the notice flag.

As the data configuration of the outgoing mail list 18B, the same data configuration as that of the received mail list 18A may be used except that the above-described notice flag is not stored. Therefore, the description of the outgoing mail list 18B is omitted.

After setting the notice flag, the mail management unit 14 notifies the control unit 15 that received mail registration is completed. The control unit 15 determines whether or not the first timer has expired (Step S037).

If the first timer has not expired (NO in Step S037), the process goes back to Step S033. If the first timer has expired (YES in Step S037), the editing processing unit 15 gives an instruction to the mail management unit 14 to read out the received mail list 18A (see FIG. 6). The mail management unit 14 reads out the received mail list 18A (see FIG. 6) from the mail DB 18 based on the instruction from the control unit 15, and then gives the received mail list 18A to the control unit 15 (Step S038).

The control unit 15 determines whether or not the received mail list 18A has the notice mail (Step S039). The control unit 15 retrieves a record that satisfies a condition that the reception time is included between the start time and the expired time of the first timer and that the notice flag is turned on. The record that satisfies the above-described condition is a record of the notice mail.

If the record of the notice mail is retrieved (YES in Step S039), the control unit 15 starts a second timer (Step S040). The second timer is a timer, that is, a period monitor timer of the notice mail for waiting for a notice mail that is periodically sent from the sending destination of the outgoing mail. The clocking time of the second timer (the period monitor timer) is, for example, several tens of seconds to several minutes. For example, the clocking time may be thirty seconds. The clocking time of the second timer may be or may not be the same as the clocking time of the above-described first timer. For example, the clocking time of the first timer may be set to be longer than the clocking time of the second timer by considering the period in which the outgoing mail arrives in the sending destination.

After the process of Step S040 is ended, the editing notice check processing is ended. The process goes to Step S005 (see FIG. 3A). If the record of the notice mail is not retrieved (NO in Step S039), the editing notice check processing is ended. Then the process in the sending source is ended.

If the process goes to Step S005 of FIG. 3A, automatic display processing of the outgoing mail list is performed, and editing display processing (Step S006) is performed. FIG. 3E is a flowchart illustrating an example of the outgoing mail list automatic display processing (Step S005) and the editing display processing (Step S006). The processes of Step S005 and Step S006 are called outgoing mail list and editing display processing as a whole. In Step 5 and Step 006, the control unit 15 functions as a notification control unit.

In Step S039 (Step S004), if the record of the notice mail is retrieved, the control unit 15 extracts a notice flag value in the record (Step S041). The control unit 15 gives an instruction to the mail management unit 14 to read out the outgoing mail list 18B. The mail management unit 14 reads out the outgoing mail list 18B from the mail DB 18 and then gives the outgoing mail list 18B to the control unit 15 (Step S042).

The control unit 15 specifies an outgoing mail record, which contains the same mail ID as the notice flag value extracted in Step S041, in the outgoing mail list 18B (Step S043). The control unit 15 instructs the output control unit 16 to perform special display of the specified outgoing mail as well as to display the outgoing mail list 18B (Step S044). The control unit 15 gives the outgoing mail list 18B and information of the record of the specified outgoing mail to the output control unit 16.

The output control unit 16 controls the display device 2A to display the outgoing mail list 18B on the display device 2A (corresponding to Step S045 and Step S005). The display device 2A, for example, displays the record containing the sending destination mail address of the outgoing mail and the subject of the mail as the outgoing mail list 18B for each of the outgoing mails.

At this time, the record of the outgoing mail corresponding to the notice mail is displayed in a special display form different from other forms of the record of the outgoing mail by image processing in the output control unit 16 according to the special display instruction (corresponding to Step S046 and Step S006).

FIG. 5 is a diagram illustrating an outgoing mail list screen 103 of the outgoing mail list 18B. As for the outgoing mail corresponding to the notice mail, for example, an icon or a symbol ("*" in FIG. 5) indicating "editing" of the reply mail near the sending destination mail address may be displayed. The icon or the symbol may be illuminated or flashing while being displayed.

Characters indicating the outgoing mail may be displayed as highlighted characters. The characters indicating the outgoing mail may also be displayed as oblique characters. The record of the outgoing mail may be displayed in a highly-visible manner such as highlighted display or reverse display. The record of the outgoing mail may also be displayed in a different color.

When the process of Step S046 in FIG. 3E is ended, the process goes to Step S007 (see FIG. 3A). In Step S007, the control unit 15 determines whether or not the second timer has expired. If the second timer has not expired (NO in Step S007), the control unit 15 waits until the second timer expires. If the second timer has expired (YES in Step S007), the process goes back to Step S004 to determine whether or not a notice mail is newly received within the clocking time of the second timer. Specifically, the process goes back to Step S038 of FIG. 3D. Then the processes from Step S039 to Step S041 in accordance with the presence of the notice mail are performed.

When sending a mail, the information processing apparatus 20 as the sending source of the mail periodically receives the editing notice, that is, the notice mail indicating that the sending destination of the outgoing mail is editing the reply mail. When the editing notice is received, the outgoing mail is displayed in a special form in the outgoing mail list 18B. In this way the user A of the information processing apparatus 20 may recognize that the sending destination is editing the reply mail.

In the above-described processing example, when the outgoing mail list screen 103 (see FIG. 5) is displayed by the processes of Step S005 and Step S006, the display of the outgoing mail list screen 103 is maintained until the determination is "NO" in Step S004. When a given time period passes after the process of Step S006 is ended, the display of the outgoing mail list 18B may be cancelled. In this case, the outgoing mail list screen 103 may be periodically displayed.

When the processes illustrated in FIG. 3A to FIG. 3E, the display of the outgoing mail list 18B on the display device 2A is cancelled. In this case, two cases may be assumed. One is a case where a reply mail is sent from the sending destination of the reply mail. In this case, soon after the processes illustrated in FIG. 3A to FIG. 3E are ended, the reply mail arrives in the mail server M1.

The mail sending and receiving unit 13 automatically downloads the reply mail from the mail server M1. According to the mail reception, the control unit 15 may output a display that notifies the display device 2 of the reply mail reception, or may output a sound indicating the reply mail reception through control of the output control unit 16. In this way, the user A of the information processing apparatus 20 is able to know that the reply mail is received.

The other is a case where editing of the reply mail is cancelled in the sending destination of the outgoing mail. Because the reply mail does not arrive in the mail server M1, automatic reception of the reply mail is not performed. Even when the reply mail is not received after a while the display of the outgoing mail list 18B is cancelled, the user A may suppose that the editing of the reply mail is cancelled.

Instead of or in addition to the display of the outgoing mail list 18B, output of a sound from the speaker 2B may be used to notify the user that the reply mail is being edited. If the information processing apparatus 20 (10) is mounted with a vibrator, vibration of the vibrator may be generated instead of or in addition to the sound output.

The above-described process of the mail sending source is performed in the same manner even if the mail to be edited is a new mail, a transfer mail, or an answer mail, that is, a reply mail. The flowcharts illustrated in FIG. 3A to FIG. 3E may be performed for at least one of the above-described new mail, transfer mail, and reply mail.

Process in the Mail Sending Destination

The flowchart illustrated in FIG. 4A is started when the outgoing mail that is sent in Step S002 of FIG. 3A is received by the mail sending and receiving unit 13 (see FIG. 2) of the information processing apparatus 10 from the mail server M2 (see FIG. 2).

For example, according to the automatic mail receiving setting, the mail sending and receiving unit 13 of the information processing apparatus 10 accesses the mail server M2 that stores the mail box of the mail address "B," and then downloads the mail in the mail box. The information processing apparatus 10 may receive the outgoing mail from the user A, that is, the information processing apparatus 20. When the mail is received, the radio path establishment processing by the radio control unit 12 and the packet call establishment processing by the call control unit 11 are performed.

The mail sending and receiving unit 13 gives the received outgoing mail, that is, the received mail to the control unit 15. The control unit 15 gives an instruction to the mail management unit 14 to register the received mail. The mail management unit 14 stores the received mail in the mail DB 18 and registers the received mail in the received mail list 18A (see FIG. 6) (the received mail register processing in Step S101).

The control unit 15 performs received mail list display processing (Step S102). The control unit 15 gives an instruction to the mail management unit 14 to read out the received mail list 18A. The mail management unit 14 reads out the received mail list 18A from the mail DB 18 and gives the received mail list 18A to the control unit 15. The control unit 15 gives the received mail list 18A to the output control unit 16. The output control unit 16 displays a display screen of the received mail list 18A, that is, a received mail list screen 104 (see FIG. 5) on the display device 2A.

As illustrated in FIG. 5, the received mail list screen 104 displays the sending source address of the received mail and the subject of the mail for each of the received mails. A received mail that is not read is displayed in a form different from the form of an already-read mail.

The user B may select a mail from the received mail list 18A by cursor key operation. In a state where a received mail is being selected from the received mail list screen 104, if the user B may call the selected received mail to the display device 2A by pressing a display key 105.

If the display key 105 is pressed, received mail content display processing is performed (Step S103). The control unit 15 obtains the received mail containing the mail ID of the selected received mail from the mail DB 18 through the mail management unit 14. The control unit 15 gives the received mail to the output control unit 16. The output control unit 16 displays the display screen of the received mail, that is, the received mail screen on the display device 2A. As illustrated in FIG. 5, the received mail screen 106 displays the sending destination mail address "A," the sending source mail address "B," the subject of the mail, and the body text of the mail.

The user B reads the received mail displayed on the received mail screen 106 and determines whether to edit or send the reply mail immediately. If the reply mail is edited immediately, a reply mail edit request may be input by pressing a reply key 107. If the reply mail is not edited immediately, the display of the received mail screen 106 may be cancelled by pressing a cancel key (not illustrated).

When the received mail screen 106 is displayed, the control unit 15 waits for input from the input device 1 to the received mail screen 106 and then determines whether or not the input notified through the input control unit 17 is the reply mail edit request (Step S104). If the input is not the reply mail edit request, for example if the cancel key is pressed (NO in Step S104), the process of the mail sending destination is ended.

If the input is the reply mail edit request (YES in Step S104), the control unit 15 performs notice mail sending processing of the editing notice mail indicating that the mail sending destination, that is, the user B, is editing the reply mail (Step S105).

Figure 4B:
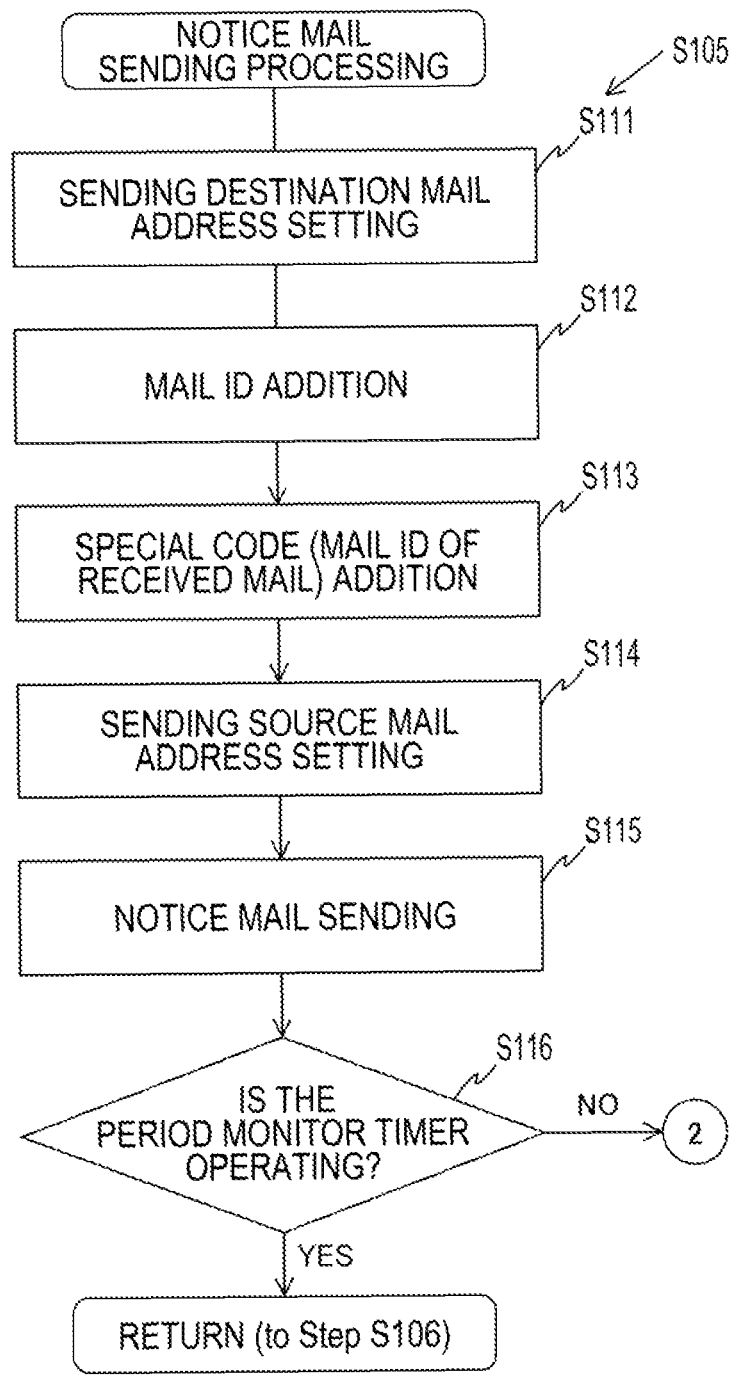
FIG. 4B is a flowchart illustrating an example of sending processing of an editing notice (notice mail) illustrated in FIG. 4A.

FIG. 4B is a flowchart illustrating an example of the notice mail sending processing (S105). When receiving the reply mail edit request, the control unit 15 generates a notice mail as internal processing of the information processing apparatus 10. The sending source mail address "A" of the received mail is set as the sending destination mail address of the notice mail (Step S111). The control unit 15 adds the mail ID of the notice mail itself to the notice mail (Step S112), and then adds the mail ID of the received mail to the notice mail as a special code indicating that the mail is a notice mail (Step S113). As a selective step, the control unit 15 sets the mail address "B" of the user B as the sending source mail address (Step S114).

FIG. 7 is a diagram typically illustrating an example of a notice mail, that is, an editing notice message. As illustrated in FIG. 7, the notice mail includes the mail ID "XXXXXXX," the special code (the mail ID of the received mail) "YYYYYYY," the sending destination mail address "A," and the sending source mail address "B." The sending source mail address is an option and may be omitted. In this example, no description is made of the subject of the notice mail or the body text of the mail. However, a specified character string may be added as the subject of the mail or the body text of the mail.

After completing generation of a notice mail, the control unit 15 instructs the mail sending and receiving unit 13 to send the notice mail. The mail sending and receiving unit 13 sends the notice mail in the same manner as in Step S002 (see FIG. 3A and FIG. 3C) (Step S115). Therefore, the notice mail, that is, the editing notice message is sent through the network N to the information processing apparatus 20 as the sending source of the received mail.

After the process of Step S115 is ended, the control unit 15 determines whether or not the period monitor timer T (described below) is operating (Step S116). If the period monitor timer T is not operating (NO in Step S116), the notice mail sending processing is ended. The process goes to Step S106 (see FIG. 4A). If the period monitor timer T is operating (YES in Step S116), the process goes to Step S124 in FIG. 4C.

Figure 4C:
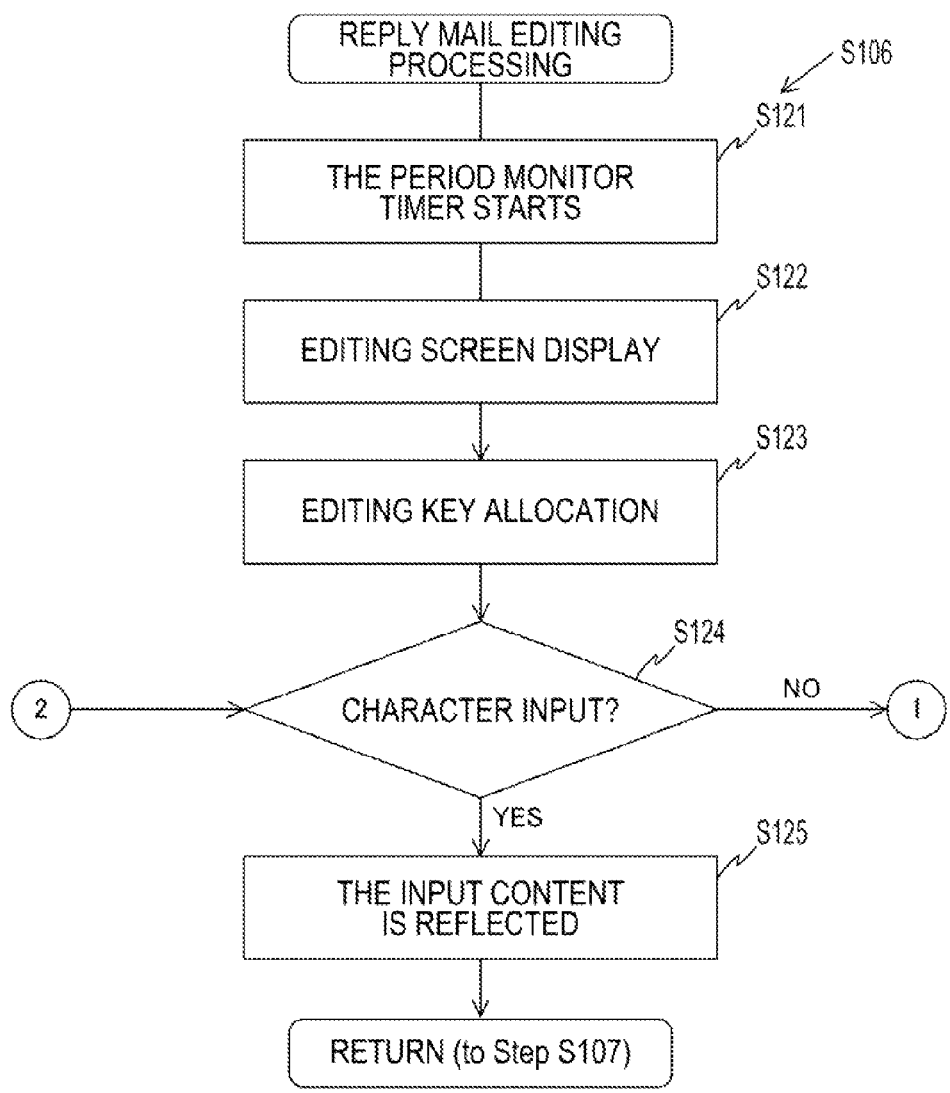
FIG. 4C is a flowchart illustrating an example of reply mail editing processing illustrated in FIG. 4A.

In Step S106, reply mail editing processing is performed. FIG. 4C is a flowchart illustrating an example of the reply mail editing processing. In FIG. 4C, the control unit 15 starts the timer T (see FIG. 5) provided in the control unit 15 (Step S121).

The timer T (the period monitor timer) is used to monitor a sending period of the notice mail. The clocking time of the timer T is, for example, several tens of seconds to several minutes. The clocking time of the timer T may be, for example, thirty seconds. For example, the clocking time of the timer T may be determined in such a way that the timer T and the second timer are synchronized with each other by considering the clocking time of the second timer in the sending destination of the notice mail.

The control unit 15 performs editing screen display processing of the reply mail (Step S122). The process of Step S122 is almost the same as the editing screen display processing of Step 011 illustrated in FIG. 3B. Thus, the detailed description is omitted. In the editing screen for the reply mail displayed on the display device 2A, the sending source address of the received mail is entered in advance in an input column of the sending destination mail address. In the input column of the subject of the mail, the character string indicating that the mail is a reply mail, for example, a character string added with "Re:" is entered as the subject of the received mail. An entry content of the body text of the received mail is entered in advance in an entry column of the body text of the mail. The user A may refer to the entry of the body text of the received mail to generate the body text of the reply mail.

The processes of Step S123 to Step S125 are the same as the processes of Step S012 to Step S014 illustrated in FIG. 3B. Thus, the descriptions are omitted. In Step S123 to Step S125, the input content of the user A is reflected on the display content. When Step S125 is ended, the process goes to Step S107 of FIG. 4A.

In Step S107, the control unit 15 determines whether the timer T operated in Step S121 has expired or not. If the timer T has not expired (NO in Step S107), the control unit 15 waits until the timer T expires. If the timer T has expired (YES in Step S107), the control unit 15 determines whether or not the editing of the reply mail is completed (Step S108).

The editing of the reply mail is completed if the mail transmission key 102 is pressed with respect to the editing screen 108. When the control unit 15 is notified by the input control unit 17 that the mail transmission key 102 is pressed, the control unit 15 determines that the editing of the reply mail is completed (YES in Step S108). Then the control unit 15 gives an instruction to the mail sending and receiving unit 13 to send the reply mail containing the display content of the editing screen 108.

The mail sending and receiving unit 13 performs reply mail sending processing (Step S109). The process of Step S109 is the same as the mail sending processing (see FIG. 3A and FIG. 3B) in Step S002. Thus, the description is omitted. When the reply mail sending processing is ended, the process in the mail sending destination illustrated in FIG. 4A is ended.

In Step S108, when the control unit 15 is notified by the input control unit 17 that the cancel key of the reply mail editing is pressed, the control unit 15 determines that the reply mail editing is cancelled (CANCEL in Step S108), and then ends the process of the mail sending destination.

In Step S108, when the control unit 15 is not notified that the mail transmission key or the cancel key is pressed, the control unit 15 determines that the reply mail editing is not completed (NO in Step S108). The process goes back to Step S105 (FIG. 4B). The control unit 15 periodically sends the notice mail. In this manner, during a period in which the reply mail editing is started until the mail transmission key or the cancel key is pressed, the notice mail is sent each time the period monitor timer T expires.

According to the above-described process of the sending destination, when the reply mail editing is determined, the notice mail indicating that the sending destination is editing the reply mail is generated and is then sent or returned to the sending source of the received mail. The notice mail is continuously sent in a monitoring period determined by the timer T until the reply mail editing is completed or cancelled. Therefore, the sending source of the received mail, that is, the user A is easily able to know that the user B is editing the reply mail because of a special display on the above-described outgoing mail list 18B.

If the information processing apparatus 10 is a portable small terminal device such as a mobile phone or a smartphone, the document editing environment is inferior to that of a PC because of restriction of the number of keys and buttons and of sizes of the keys and buttons. Accordingly, the time required to generate a reply mail is longer than the time using a PC. Therefore, it is not easy for the user A who sent a mail to determine whether or not the mail sending destination, that is, the user B, is editing the reply mail.

According to the above-described embodiment, the user A is able to know whether or not the user B is editing the reply mail shortly after sending a mail. Therefore, it is possible to reduce if not prevent the user A from generating and sending a mail again or calling the user B even though the user B is editing the reply mail. Consequently, this may reduce if not prevent the user A and the user B from performing useless operations.

In the above-described first embodiment, description was made of an example of using an electronic mail as a way to send an editing notice. Alternatively, a short message may be used to send the editing notice if the information processing apparatuses 10 and 20 support a short message service (SMS).

Second Embodiment

Next, description will be made of a second embodiment of the information processing apparatus. Since there are similarities between the first embodiment and the second embodiment, descriptions of the similarities are omitted. Differences between the first embodiment and the second embodiment will be mainly described.

The second embodiment describes a case where information processing apparatuses for sending and receiving mails are mobile phone terminals. A mobile phone terminal that is required to send a reply mail in response to an outgoing mail sends a call signal, which is added with an editing notice message, to a mobile phone terminal of the sending source of the outgoing mail as a way to send the editing notice.

A service for sending a call signal containing a text message to a sending destination and displaying a message with an incoming call notification on a display device of a mobile information terminal of the sending destination is performed as, for example, "Chaku-moji service" provided by NTT DoCoMo, Inc. The above-described service will be referred to as a message addition service in the present specification.

Figure 8:
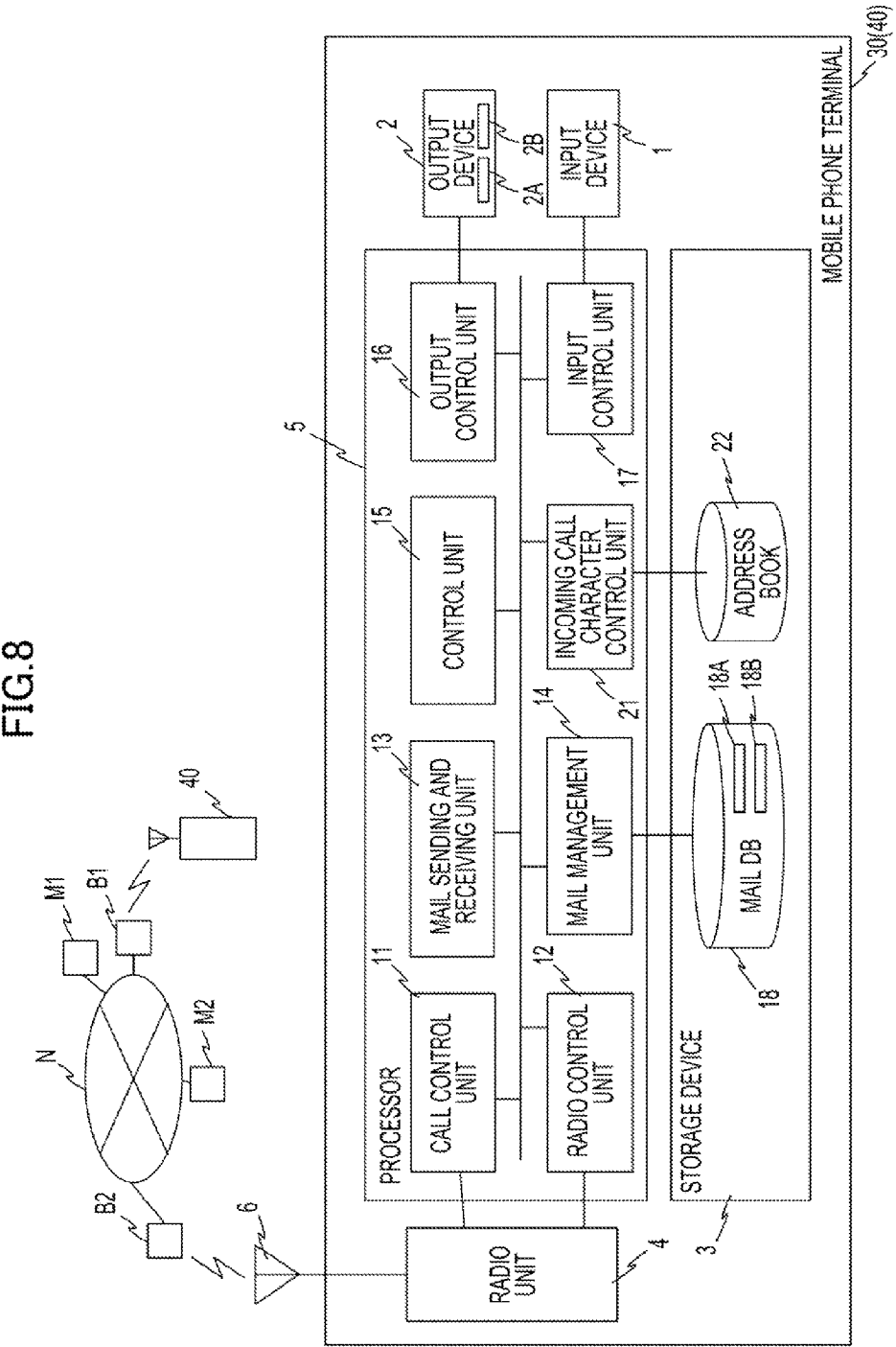
FIG. 8 is a diagram illustrating a configuration example of a mobile phone terminal as a second embodiment of the information processing apparatus.

FIG. 8 is a diagram illustrating a configuration example of an information processing apparatus, that is, a mobile phone terminal. In FIG. 8, a mobile phone terminal 30 is different as follows from the information processing apparatus 20 illustrated in FIG. 2.

The processor 5 of the mobile phone terminal 30 activates an incoming call character control unit 21 by executing a program. The storage area of the storage device 3 stores an address book 22. In the address book 22, phone numbers corresponding to mail addresses are registered.

As an operation example, description will be made of a case where a mobile phone terminal 40 of the user A illustrated in FIG. 8 sends a mail to the mobile phone terminal 30 of the user B. The mobile phone terminal 40 has the same configuration and function as the mobile phone terminal 30 illustrated in FIG. 8.

Figure 9:
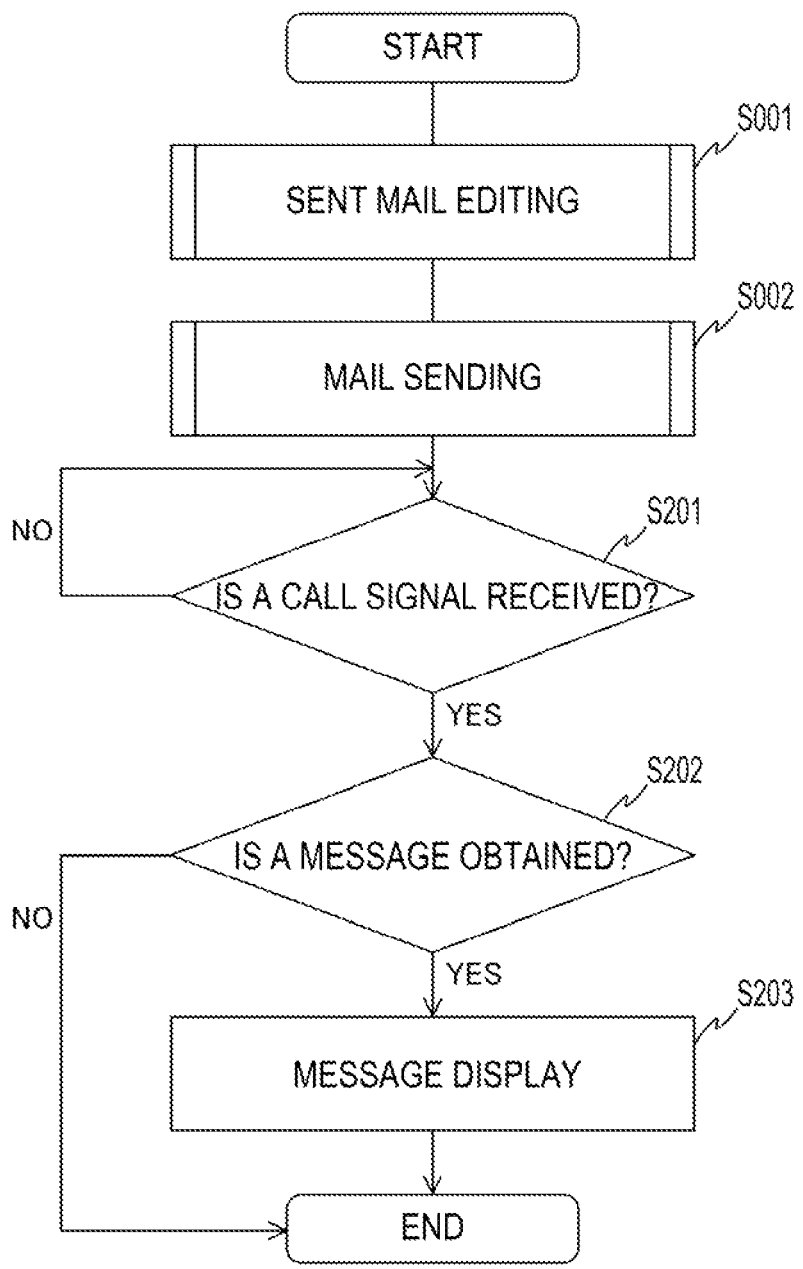
FIG. 9 is a flowchart illustrating mail sending processing performed by a mobile phone terminal as the sending source of the mail according to the second embodiment.

FIG. 9 is a flowchart of a mobile phone terminal that is the sending source of the mail. The process illustrated in FIG. 9 is performed in the mobile phone terminal 40. In the processes illustrated in FIG. 9, the processes of Step S001 and Step S002 are the same as in the first embodiment (see FIG. 3A, FIG. 3B, and FIG. 3C). Thus, the descriptions are omitted.

In Step S201, the call control unit 11 receives a call signal from the mobile phone terminal 30. That is, the call signal from the mobile phone terminal 30, which is a signal "SETUP", arrives in the mobile phone terminal 40.

The incoming call character control unit 21 obtains text message data included in the call signal and gives the text message data to the output control unit 16 (Step S202). The output control unit 16 receives an incoming call sound instruction based on the arrival of the call signal from, for example, the call control unit 11.

The output control unit 16 outputs an incoming call ringtone from the speaker 2B and displays a message based on the text message data, for example, specified messages such as "editing the reply mail" or "editing the reply mail for XX seconds" (Step S203).

The incoming call character control unit 21 receives, from the output control unit 16, a notice indicating that display processing of the editing message is completed. The incoming call character control unit 21 gives a call disconnection instruction to the call control unit 11. The call control unit 11 sends a signal such as, for example, a signal CLEAR that disconnects or releases communication to the mobile phone terminal 30. When receiving a disconnection signal or a release signal, the mobile phone terminal 40 stops call setting processing.

When the process of Step S204 is ended, the process illustrated in FIG. 9 is ended. After that, each time the call signal that includes the editing notice message is received from the mobile phone terminal 30, the processes of Step S201 to S204 are performed. The display device 2A of the mobile phone terminal 20 periodically displays the editing notice message from the user B. Thus, the user A may easily know that the user is editing the reply mail.

The process in the mobile phone terminal 30 of the user B as the mail sending destination is the same as the process illustrated in FIG. 4A. However, in Step S105, the content of the editing notice processing is different from that in the first embodiment (see FIG. 4B).

Figure 10:
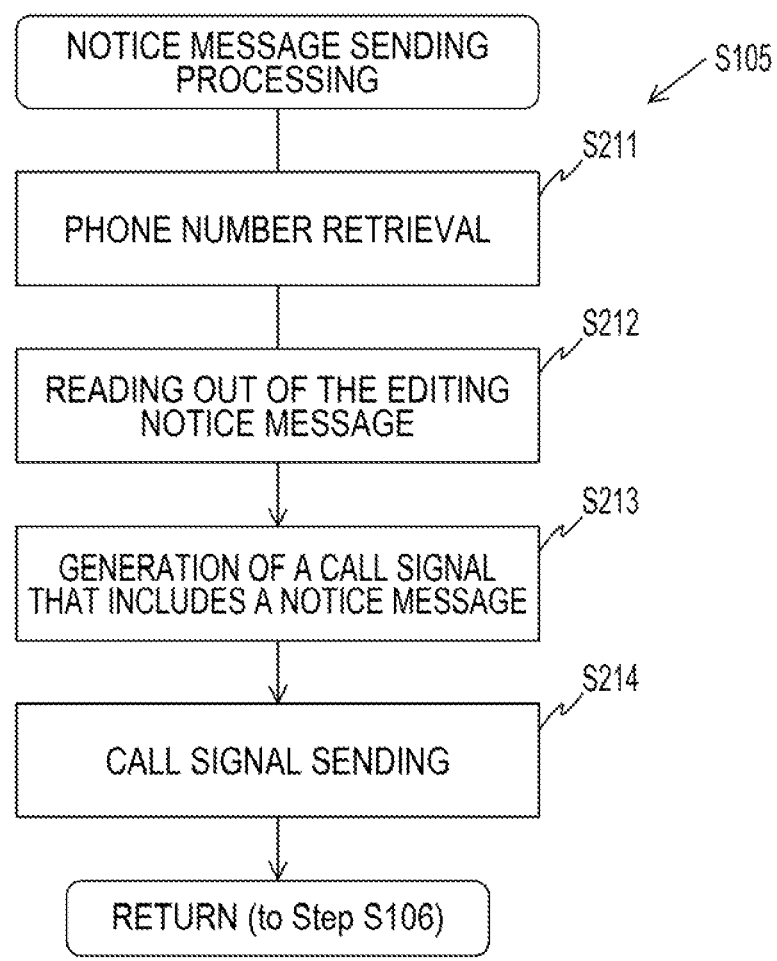
FIG. 10 is a flowchart illustrating an example of sending processing of an editing notice (notice message) according to the second embodiment.

FIG. 10 is a flowchart illustrating an example of the editing notice processing in the second embodiment, that is, notice message sending processing. When the process illustrated in FIG. 10 is started, the control unit 15 gives the sending destination of the reply mail, that is, the mail address of the sending source of the received mail to the incoming call character control unit 21.

The incoming call character control unit 21 accesses the address book 22 on the storage device 3 and retrieves a phone number corresponding to a mail address (Step S211). The incoming call character control unit 21 reads out text data of the editing notice that is stored in advance in the storage area of the storage device 3, that is, data of the notice message, and then gives the data with the phone number to the call control unit 11 (Step S212).

The "editing" notice message is a text message having a content that notifies the mail sender (the user A) that the reply mail is being edited, such as, for example, "editing the reply mail" or "editing the reply mail for XX seconds." The text content may be determined freely if the text content may be added to the call signal in the restriction.

When receiving the phone number and the message text, the call control unit 11 generates a call signal that is used to call the mobile phone terminal 40. At this time, the message text is added to the call signal (Step S213). After that, the call control unit 11 sends the call signal that includes the notice message (Step S214).

The call signal is received by the base station B1 and reaches a base station B2 through the network N, and then arrives in the mobile phone terminal 30. The above-described call signal that includes the notice message is periodically sent to the mobile phone terminal 40 each time the period monitor timer T expires.

As described above, in the second embodiment, the editing notice message is added to the call signal and is then sent, and the text of the editing notice message is displayed on the display device 2A. This enables the sending source of the mail to know that the sending destination of the mail is editing the reply mail. The incoming call ringtone may provide an opportunity in which the user refers to the notice message. Instead of the incoming call ringtone, vibration of a vibrator may be used.

In the second embodiment, the sending destination of the mail sends the text data of the editing message to the sending source of the mail. Alternatively, the sending destination of the mail may include a code for specifying a text of the editing message. Based on the code or the flag, the sending source of the mail may display a message text that is stored in advance in the sending source of the mail on the display device 2A.

According to an embodiment of the present invention, the sending source of the mail is able to know whether or not the sending destination of the mail is editing the reply mail.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A system comprising:
a first apparatus including:
a first memory configured to store a first program; and
a first processor configured to execute the first program including a first process, the first process including:
receiving a message; and
controlling a generation process for generating data to start in response to a command issued for a reply message responding to the received message, the data indicating that the reply message is being edited; and
a second apparatus including:
a second memory configured to store a second program; and
a second processor configured to execute the second program including a second process, the second process including:
controlling a display process for displaying a notice based on the data,
wherein the message is sent by the second apparatus,
wherein the display process is controlled to start in response to the data, and the display process is controlled to end when a next data subsequent to the data is not generated by the generation process within a given time period after the generation process generated the data, and
wherein, until sending of the reply message is instructed, generating of the data is repeated based on editing of the reply message by the controlling of the generation process.

2. The system according to claim 1, wherein
the notice indicates that the reply message is being edited.

3. The system according to claim 2, wherein
the notice is displayed in a display form different from a display form of messages.

4. The system according to claim 1, wherein
the first apparatus and the second apparatus communicate via a network using radio data communication in at least partly of the network.

5. The system according to claim 1, wherein
the command is issued in response to an instruction to wait for input to an entry column for editing the reply message.

6. The system according to claim 1, wherein at least one of the message and the reply message is a text message communicated by a message service.

7. The system according to claim 1, further comprising:
a message server configured to relay at least one of the message and the reply message between the first apparatus and the second apparatus.

8. An apparatus comprising:
a memory configured to store a program; and
a processor configured to execute the program including a process, the process including:
receiving a message; and
controlling a generation process for generating data to start, in response to a command issued for a reply message responding to the received message, the data indicating that the reply message is being edited,
wherein the message is sent by another apparatus that is to control a display process for displaying a notice based on the data,
wherein the display process is controlled to start in response to the data, and the display process is controlled to end when a next data subsequent to the data is not generated by the generation process within a given time period after the generation process generated the data, and
wherein, until sending of the reply message is instructed, generating of the data is repeated based on editing of the reply message by the controlling of the generation process.

9. An apparatus comprising:
a memory configured to store a program; and
a processor configured to execute the program including a process, the process including:
displaying a notice based on data, which is generated by a generation process of another apparatus in response to a command issued for a reply message responding to a message received by the another apparatus, the notice indicating that the reply message is being edited,
wherein the message is sent by the apparatus,
wherein a display process is controlled to start in response to the data, and the display process is controlled to end when a next data subsequent to the data is not generated by the generation process within a given time period after the generation process generated the data, and
wherein, until sending of the reply message is instructed, generating of the data by the generation process is repeated based on editing of the reply message.

10. A method of communicating between a first apparatus and a second apparatus, the method comprising:
receiving a message, by the first apparatus;
controlling a generation process for generating data to start, in response to a command issued for a reply message responding to the received message, by the first apparatus, the data indicating that the reply message is being edited; and
controlling, by the second apparatus, a display process for displaying a notice to start in response to the data, the notice indicating that the reply message is being edited,
wherein the message is sent by the second apparatus,
wherein the display process is controlled to start in response to the data, and the display process is controlled to end when a next data subsequent to the data is not generated by the generation process within a given time period after the generation process generated the data, and
wherein, until sending of the reply message is instructed, generating of the data is repeated based on editing of the reply message by the controlling of the generation process.

11. The method according to claim 10, further comprising:
relaying, by a message server, at least one of the message and the reply message.

12. The method according to claim 10, wherein
the command is issued in response to an instruction to wait for input to an entry column for editing the reply message.

13. A method comprising:
receiving a message, by a processor; and
controlling a generation process for generating data to start, in response to a command issued for a reply message responding to the received message, the data indicating that the reply message is being edited,
wherein the message is sent by an apparatus that is to control a display process for displaying a notice based on the data,
wherein the display process is controlled to start in response to the data, and the display process is controlled to end when a next data subsequent to the data is not generated by the generation process within a given time period after the generation process generated the data, and wherein, until sending of the reply message is instructed, generating of the data is repeated based on editing of the reply message by the controlling of the generation process.

14. A method comprising:

displaying, by a processor of a first apparatus, a notice based on data, which is generated by a generation process of a second apparatus in response to a command issued for a reply message responding to a message received by the second apparatus, the notice indicating that the reply message is being edited, wherein the message is sent by the first apparatus, wherein a display process is controlled to start in response to the data, and the display process is controlled to end when a next data subsequent to the data is not generated by the generation process within a given time period after the generation process generated the data, and wherein, until sending of the reply message is instructed, generating of the data by the generation process is repeated based on editing of the reply message.

15. A non-transitory computer-readable recording medium storing a program that causes a computer to execute a process, the process comprising:

receiving a message; and controlling a generation process for generating data to start, in response to a command issued for a reply message responding to the received message, the data indicating that the reply message is being edited, wherein the message is sent by an apparatus that is to control a display process for displaying a notice based on the data, wherein the display process is controlled to start in response to the data, and the display process is controlled to end when a next data subsequent to the data is not generated by the generation process within a given time period after the generation process generated the data, and wherein, until sending of the reply message is instructed, generating of the data is repeated based on editing of the reply message by the controlling of the generation process.

16. A non-transitory computer-readable recording medium storing a program that causes a computer to execute a process, the process comprising:

displaying a notice based on data, which is generated by a generation process of an apparatus in response to a command issued for a reply message responding to a message received by the apparatus, the notice indicating that the reply message is being edited, wherein the message is sent by an apparatus that controls the displaying the notice based on the data, wherein a display process is controlled to start in response to the data, and the display process is controlled to end when a next data subsequent to the data is not generated by the generation process within a given time period after the generation process generated the data, and wherein, until sending of the reply message is instructed, generating of the data by the generation process is repeated based on editing of the reply message.

17. The system according to claim 1, wherein the second apparatus includes a keyboard, and the message is sent by the second apparatus in response to typing a key in the keyboard.

18. The system according to claim 1, wherein the first apparatus includes a keyboard, and the command is issued in response to typing a key in the keyboard.

19. The method according to claim 10, wherein the second apparatus includes a keyboard, and the message is sent by the second apparatus in response to typing a key in the keyboard.

20. The method according to claim 10, wherein the first apparatus includes a keyboard, and the command is issued in response to typing a key in the keyboard.

21. The method according to claim 10, wherein the controlling of the display process is executed based on the generating of the data by the generation process which is repeated until the sending of the reply message is instructed.

* * * * *